United States Patent
Dorfman et al.

(10) Patent No.: US 10,698,779 B2
(45) Date of Patent: Jun. 30, 2020

(54) CLUSTERED DISK ERROR RECOVERY

(71) Applicant: Infinidat Ltd., Herzliya (IL)

(72) Inventors: Mike Dorfman, Tel Aviv (IL); Nick Loffe, Bat-Yam (IL); Sagi Grabois, Rishon le Zion (IL)

(73) Assignee: INFINIDAT LTD., Herzliya Pituach (IL)

( * ) Notice: Subject to any disclaimer, the term of this patent is extended or adjusted under 35 U.S.C. 154(b) by 85 days.

(21) Appl. No.: 15/810,174

(22) Filed: Nov. 13, 2017

(65) Prior Publication Data

US 2019/0146890 A1    May 16, 2019

(51) Int. Cl.
*G06F 11/20* (2006.01)
*G06F 3/06* (2006.01)
*G06F 11/16* (2006.01)

(52) U.S. Cl.
CPC .......... *G06F 11/2089* (2013.01); *G06F 3/061* (2013.01); *G06F 3/0659* (2013.01); *G06F 11/1658* (2013.01); *G06F 2201/805* (2013.01)

(58) Field of Classification Search
CPC ............. G06F 11/1658; G06F 11/1666; G06F 11/2089; G06F 11/2097; G06F 3/0659; G06F 3/061; G06F 3/067
See application file for complete search history.

(56) References Cited

U.S. PATENT DOCUMENTS

| | | | | |
|---|---|---|---|---|
| 2003/0159082 A1* | 8/2003 | Brant | .................. | G06F 12/0866 714/6.12 |
| 2005/0097402 A1* | 5/2005 | Baba | .................. | G06F 11/1666 714/42 |
| 2005/0120267 A1* | 6/2005 | Burton | ................ | G06F 11/0727 714/13 |
| 2014/0022885 A1* | 1/2014 | Myrah | ................ | H04L 43/0817 370/216 |
| 2014/0351627 A1* | 11/2014 | Best | .................... | G06F 11/2053 714/6.11 |

* cited by examiner

*Primary Examiner* — Jigar P Patel
(74) *Attorney, Agent, or Firm* — Reches Patent (57) ABSTRACT

A method for disk error recovery management, the method may include (A) executing by a first control node, a first disk error recovery process that involves halting access, of the first control node, to a first group of storage devices. (B) Receiving by the first control node, during the execution of the disk error recovery process, a request to access a given storage device of the first group. (C) Directing the request to access the given storage device to a second control node if the second control node is not currently involved in an error recovery processes that involves halting access to the given storage device. (D) Accessing the given storage device by the second control node, during the execution of the disk error recovery process.

19 Claims, 7 Drawing Sheets

CLUSTERED DISK ERROR RECOVERY

BACKGROUND

When a command is sent to a SCSI device, the sender (also called initiator) of the command needs to set a timer. If the command is not responded within the defined timeout, the sender needs to perform disk error recovery. The timeout can occur because the command was lost in transit, or due to device failure, due to communication failure, or due to failure of any hardware module between the sender and the SCSI device.

The process of disk error recovery is generally composed of several steps and includes escalation throughout the steps until one of the steps finally succeed. The first step may be as simple as aborting the command. If the first step fails, the second step would be resetting the device that did not respond. The next step would be resetting the bus that connects the sender to the non-responding device and the last step would be resetting the SCSI communication interface that enables the connection between the sender (initiator) and the storage device, usually known as HBA (host bus adapter), that may control one or multiple ports (buses).

The entire process and particularly the higher steps are time consuming. In addition, the two last steps influence not only the non-responding drive, but also all the drives connected to the bus or related to the HBA. Furthermore, any access towards the affected devices (whether the non-responding drive, the drives attached to the bus being reset, or the drives coupled to the HBA) will be halted, until the error recovery process is over, causing latency in responding to I/O access requests towards the affected devices.

There is a need to avoid latencies caused by error recovery process, in a clustered storage system.

SUMMARY

There may be provided a method, a storage system and a computer program product as illustrated in the specification and/or the claims and/or the drawings.

There may be provided a method for disk error recovery management, the method may include executing by a first control node of a storage system, a first disk error recovery process; wherein the first disk error recovery process involves halting access, of the first control node, to a first group of storage devices; receiving by the first control node, during the execution of the disk error recovery process, a request to access a given storage device of the first group; directing the request to access the given storage device to a second control node of the storage system if the second control node is not currently involved in an error recovery processes that involves halting access to the given storage device; and accessing the given storage device by the second control node, during the execution of the disk error recovery process.

The storage devices may include disks.

The method may include denying the request to access the given storage device if the second control node is currently involved in the error recovery processes that involves halting access to the given storage device.

The method may include relaying the request to access the given storage device to a third control node if (i) the third control node is not currently involved in the error recovery processes that involves halting access to the given storage device, and (ii) if the second control node is currently involved in the error recovery processes that involves halting access to the given storage device.

The method may include receiving a request to perform, by a second control node of the storage system, a second disk error recovery process that involves halting access, of the second control node, to at least one storage device of the first group; and denying the request to perform the second disk error recovery process, at least until a completion of the first disk error recovery process.

There may be provided a method for disk error recovery management, the method may include executing by a first control node of a storage system, a first disk error recovery process; wherein the first disk error recovery process involves halting access, of the first control node, to a first group of storage devices; receiving a request to perform, by a second control node of the storage system, a second disk error recovery process that involves halting access, of the second control node, to at least one storage device of the first group; and denying the request to perform the second disk error recovery process, at least until a completion of the first disk error recovery process.

The denying of the request may be executed by an arbiter of the storage system.

The arbiter may be coupled to the first and second control node but does not belong to either one of the first and second control nodes.

The arbiter belongs to at least one of the first and second control nodes.

The method may include receiving by the first control node, during the execution of the disk error recovery process, a request to access a given storage device of the first group; directing the request to access the given storage device to the second control node of the storage system; and accessing the given storage device by the second control node, during the execution of the disk error recovery process.

There may be provided a method for disk error recovery management, the method may include receiving multiple requests, from a set of control nodes of a storage system to perform error recovery processes; wherein an execution, in parallel, of the multiple requests will cause at least a subset of the set of control nodes to concurrently halt access to a same storage device; and preventing the concurrent halt access to the same storage device by granting only some of the multiple requests.

The method may include selecting, out of the multiple requests, the some of the multiple requests.

The selecting involves applying a random selection process.

The selecting involves applying a pseudo-random selection process.

The selecting involves applying a non-random selection process.

The selecting may be responsive to an outcome of at least one previous selection process.

The selecting may be executed by an arbiter of the storage system.

The arbiter may be coupled to the first and second control node but does not belong to either one of the first and second control nodes.

The arbiter belongs to at least one of the first and second control nodes.

There may be provided a computer program product that stores instructions that once executed by a storage system causes the storage system to execute by a first control node of a storage system, a first disk error recovery process; wherein the first disk error recovery process involves halting access, of the first control node, to a first group of storage devices; receive by the first control node, during the execution of the disk error recovery process, a request to access a given storage device of the first group; direct the request to access the given storage device to a second control node of the storage system if the second second control node is not currently involved in an error recovery processes that involves halting access to the given storage device; and access the given storage device by the second control node, during the execution of the disk error recovery process.

The computer program product may store instructions for denying the request to access the given storage device if the second control node is currently involved in the error recovery processes that involves halting access to the given storage device.

The computer program product may store instructions for relaying the request to access the given storage device to a third control node if (i) the third control node is not currently involved in the error recovery processes that involves halting access to the given storage device, and (ii) if the second control node is currently involved in the error recovery processes that involves halting access to the given storage device.

The storage system may be a mass storage system capable of storing petabytes.

There may be provided a storage system that may include a first control node, a second control node and multiple groups of storage devices. The first control node may be configured to execute a first disk error recovery process; wherein the first disk error recovery process involves halting access, of the first control node, to a first group of storage device out of the multiple groups; receive, during the execution of the disk error recovery process, a request to access a given storage device of the first group; and direct the request to access the given storage device to a second control node of the storage system if the second control node may be not currently involved in an error recovery processes that involves halting access to the given storage device. The second control node may be configured to access the given storage device, during the execution of the disk error recovery process.

There may be provided a storage system that comprises an arbiter, a set of control nodes, and multiple groups of storage device. The arbiter may be included in one or more control nodes of the set or may be located outside the set of control nodes. The arbiter may be configured to receive multiple requests, from a set of control nodes of a storage system to perform error recovery processes; wherein an execution, in parallel, of the multiple requests will cause at least a subset of the set of control nodes to concurrently halt access to a same storage device of the multiple storage devices; and prevent the concurrent halt access to the same storage device by granting only some of the multiple requests.

There may be provided a storage device that includes an arbiter, a first control node, a second control node and multiple groups of storage device. The first control node may be configured to execute a first disk error recovery process; wherein the first disk error recovery process involves halting access, of the first control node, to a first group of storage devices. The arbiter may be configured to: receive a request to perform, by a second control node of the storage system, a second disk error recovery process that involves halting access, of the second control node, to at least one storage device of the first group; and deny the request to perform the second disk error recovery process, at least until a completion of the first disk error recovery process.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

The following clustered storage system and methods allows continuing responding to I/O requests addressed to storage devices that are coupled to hardware components that are under recovery process. In order to achieve that goal, the system and methods of the present invention avoid scenarios where more than one control node of the cluster initiates a disk error recovery, simultaneously, and thus eliminating a situation where more than one control node is unable to access storage devices that are under recovery process.

Figure 1:
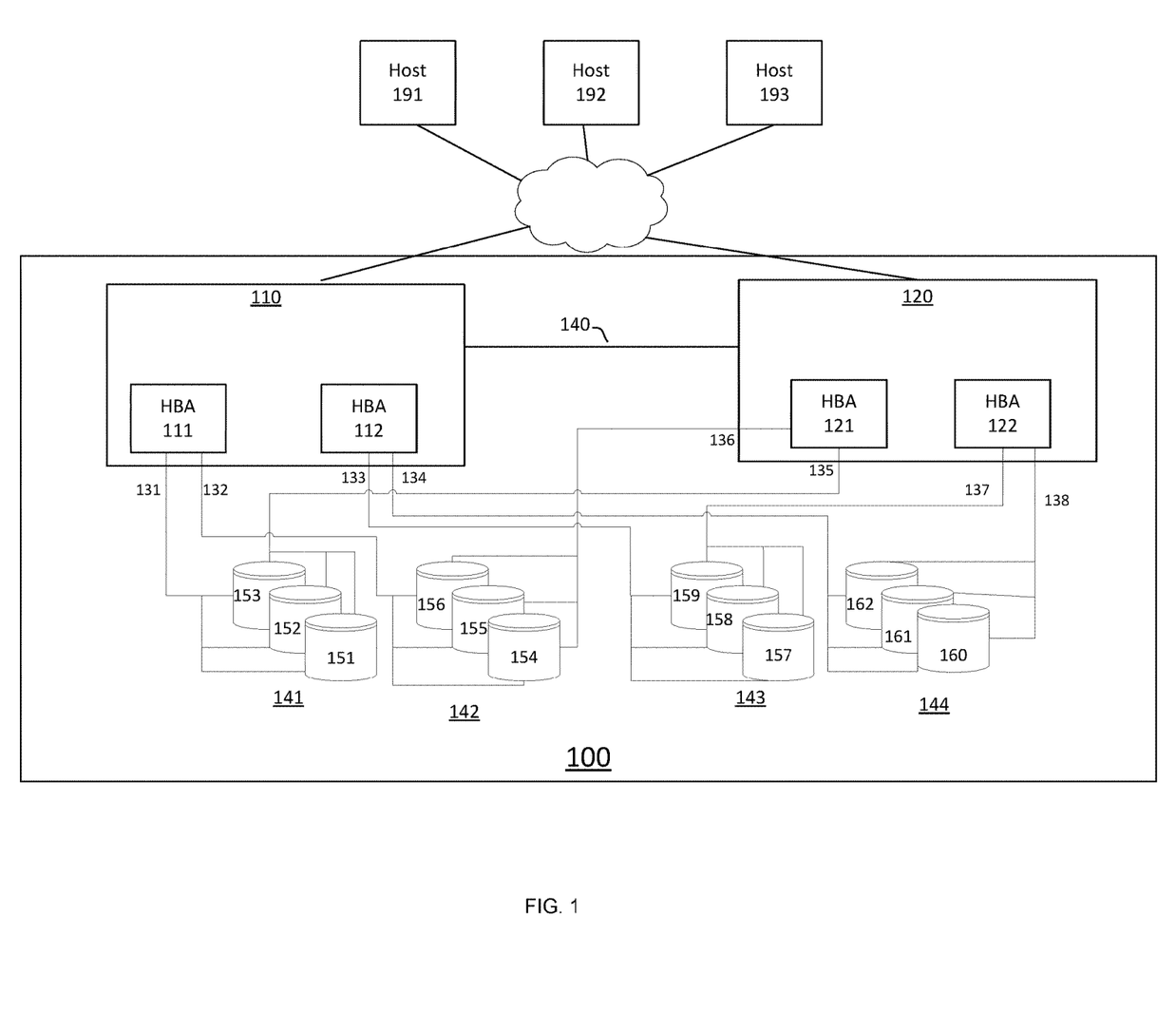
FIG. 1 illustrates an example of storage systems, a network and host computers.

FIG. 1 illustrates a storage system 100 composed of a cluster of two control nodes 110 and 120 and a storage space that includes storage devices 151-162. In this example, each control node has access to all storage devices of storage system 100. Each storage device can be accessed by both control nodes 110 and 120.

Storage system 100 provides access services for host computers 191, 192, 193 that are coupled to the storage system.

Each control node and/or arbiter module may include one or more hardware processors and/or hardware controllers such as one or more integrated circuits, chips, central processing units, and the like.

The control nodes may communicate with each other via link 140.

Each control node includes one or more storage communication interfaces that enables coupling the control node to part or all the storage devices, such as HBAs 111, 112 of control node 110, and HBAs 121, 122 of storage node 120.

Each HBA is an end-point of one or more communication lines that couple the control node to one or more storage devices.

For example, HBA 111 includes two ports, which are the end points of buses 131 and 132. Bus 131 connects control node 110 to a quarter of the storage devices, e.g., storage devices 151, 152 and 153, and bus 132 connects control node 110 to another quarter of the storage devices, e.g., storage devices 154, 155 and 156. HBA 112 of control node 110 includes two ports, which are the end points of buses 133 and 134. Bus 133 connects control node 110 to yet another quarter of the storage devices, e.g., storage devices 157, 158 and 159. Finally, Bus 134 connects control node 110 to the last quarter of the storage devices, e.g., storage devices 160, 161 and 162. Thus, HBA 111 and 112 connects control storage 110, via buses 131, 132, 133 and 134 to all the storage devices. In a similar manner, control node 120 is connected to all the storage devices, via buses 135, 136 (of HBA 121) and buses 137 and 138 (of HBA 122).

Each control node is configured to take responsibilities of the other control node when the other control node is malfunctioned or part of the modules of the other control node are non-operational.

Suppose control node 110 experiences timeout for a certain command it sent to storage device 151. Control node 110 will start a disk error recovery. As a first step, control node 110 will try to abort the command. If the abort fails, it will try to reset storage device 151. If the device reset fails, and escalation takes place, then the control node will try to reset bus 131, and if the bus reset fails, it will try to reset the entire HBA 111.

The process of resetting the bus takes few or tens of seconds and halts access, by storage node 110, not only to storage device 151, but rather halts access to a quarter of the storage devices accessible by storage node 110. The process of resetting the HBA is even longer and influences access, by storage node 110, to half of the storage devices accessible by storage node 110.

During the time period of the error recovery process, where reset of the bus 131 or the HBA 111 takes place, control node 120 may also experience a timeout, either due to the same storage device 151 or due to another storage device controlled by bus 131 or HBA 111, and may also decide to reset bus 131 and/or HBA 111. So at this point, neither control node 120 nor control node 110 can access half of the storage devices of storage system 100, e.g. storage devices 151-156. Thus, storage system 100 cannot serve access requests coming from host computers 191-193, towards half of the storage devices of the system, even though storage devices 152-156 did not result timeout and are not malfunctioned.

According to embodiments of the present invention, in order to avoid the described unavailability of storage devices occurred by the error recovery process, the following process will take place. When a control node faces a situation where a disk error recovery should take place, it requests a permission to perform disk error recovery, from an arbiter module.

If two control nodes request to perform disk error recovery simultaneously, the arbiter module will grant permission only to a first control node and issue a denial towards a second control node. If the second control node requests to perform disk error recovery while the first control node performs a disk error recovery, the second control node will receive a denial for performing disk error recovery, at least until the first control node finishes the disk error recovery. The arbiter module can reside in any control node of the storage system or may reside externally to the control nodes.

The control node that received a denial for performing disk error recovery is now available to participate in responding to access requests towards storage devices that will be affected (from the point of view of the control node that performs the disk error recovery) by the error recovery process. For example, during the time that the first control node performs error recovery to bus 131 or to HBA 111, any access request directed towards the storage devices that are affected by the reset, e.g., storage devices 151-156 (or at least 152-156), are handled by the second control node.

The control node that performs disk error recovery, e.g. storage node 110, may redirect to storage node 120, during the disk error recovery, any access request it receives from host computers 191-193 that is directed to affected storage devices, i.e., storage devices that are disabled for access by storage node 110.

Figure 2:
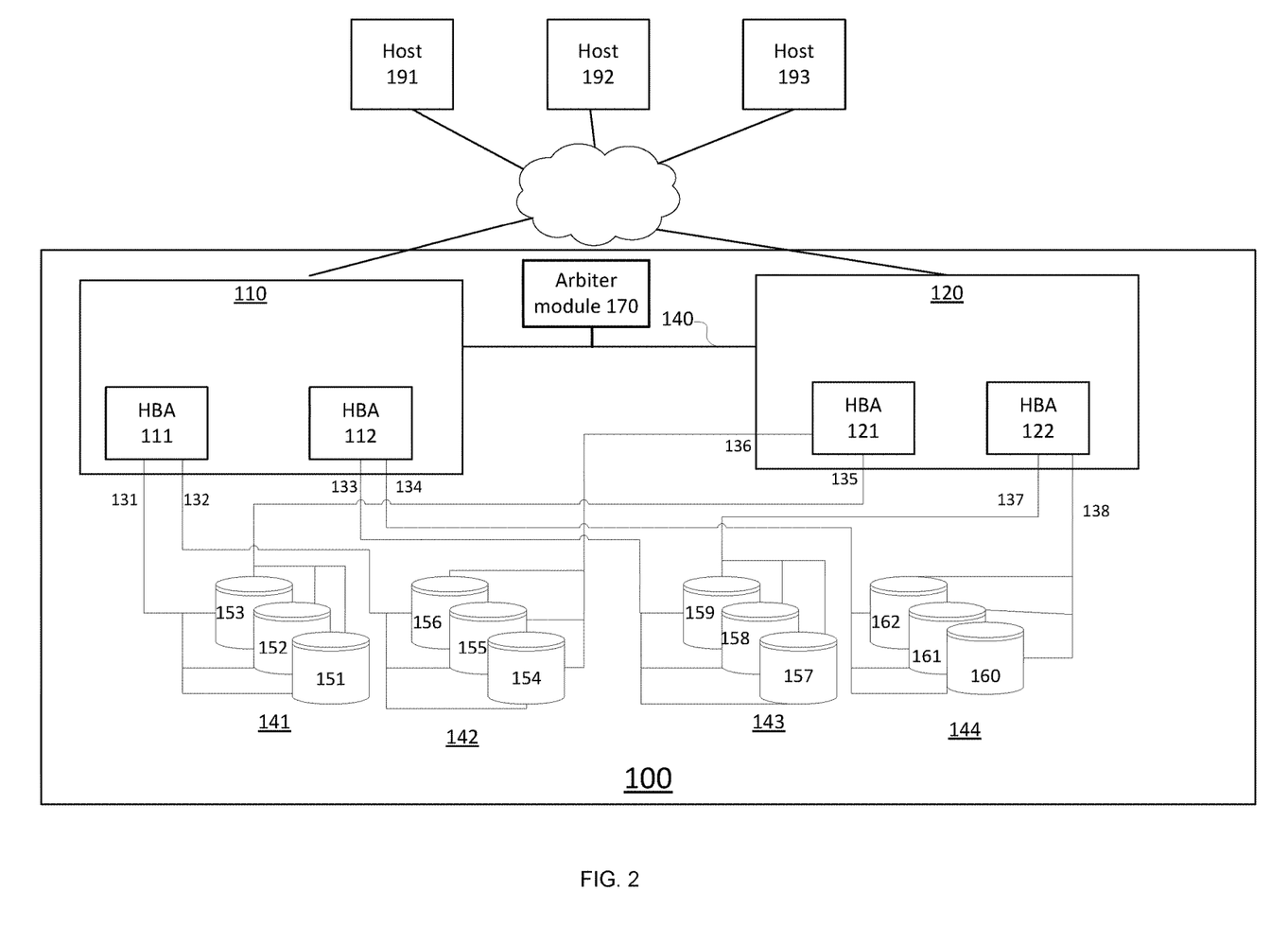
FIG. 2 illustrates an example of a storage system, a network and host computers.
Figure 3:
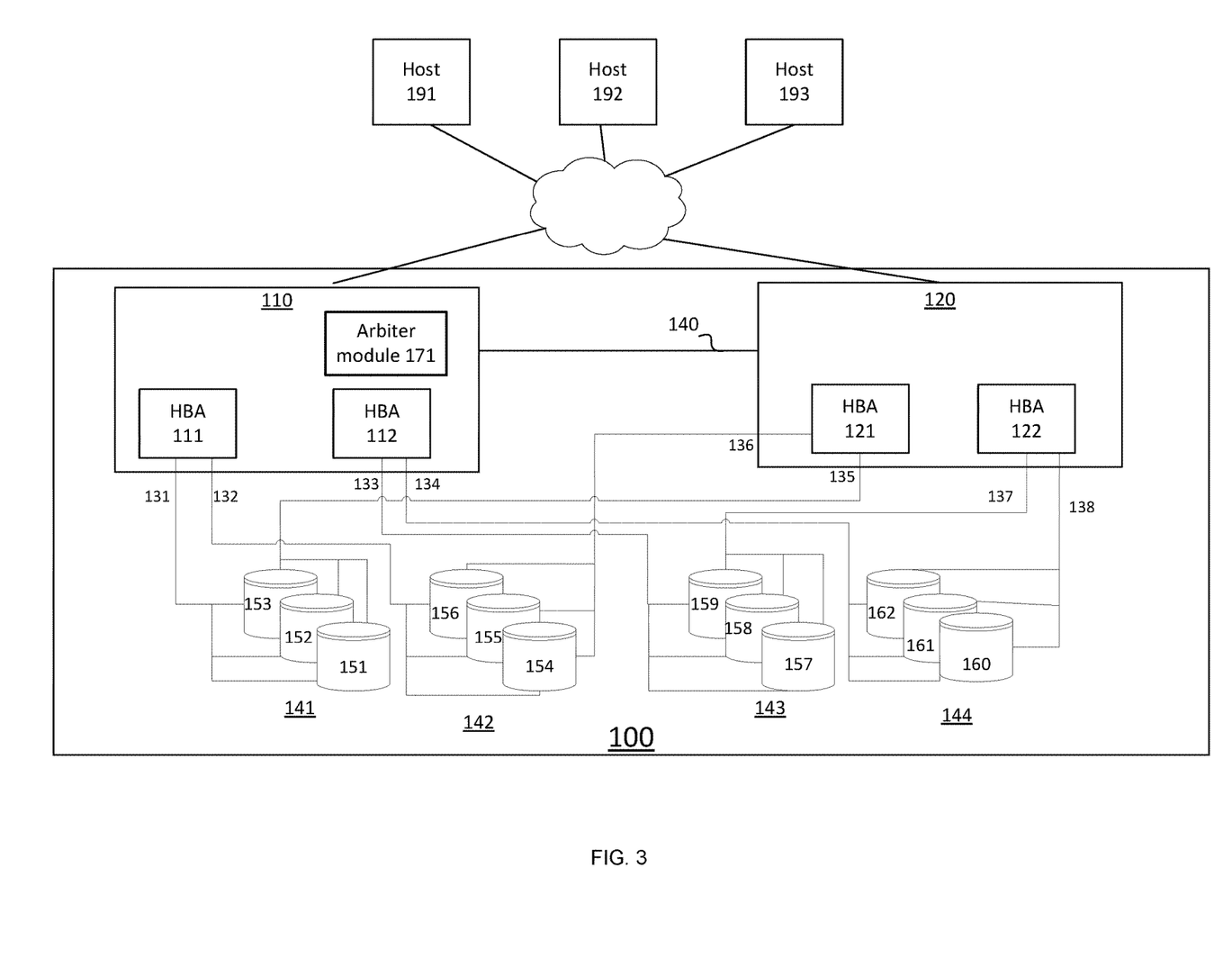
FIG. 3 illustrates an example of a storage system, a network and host computers.
Figure 4:
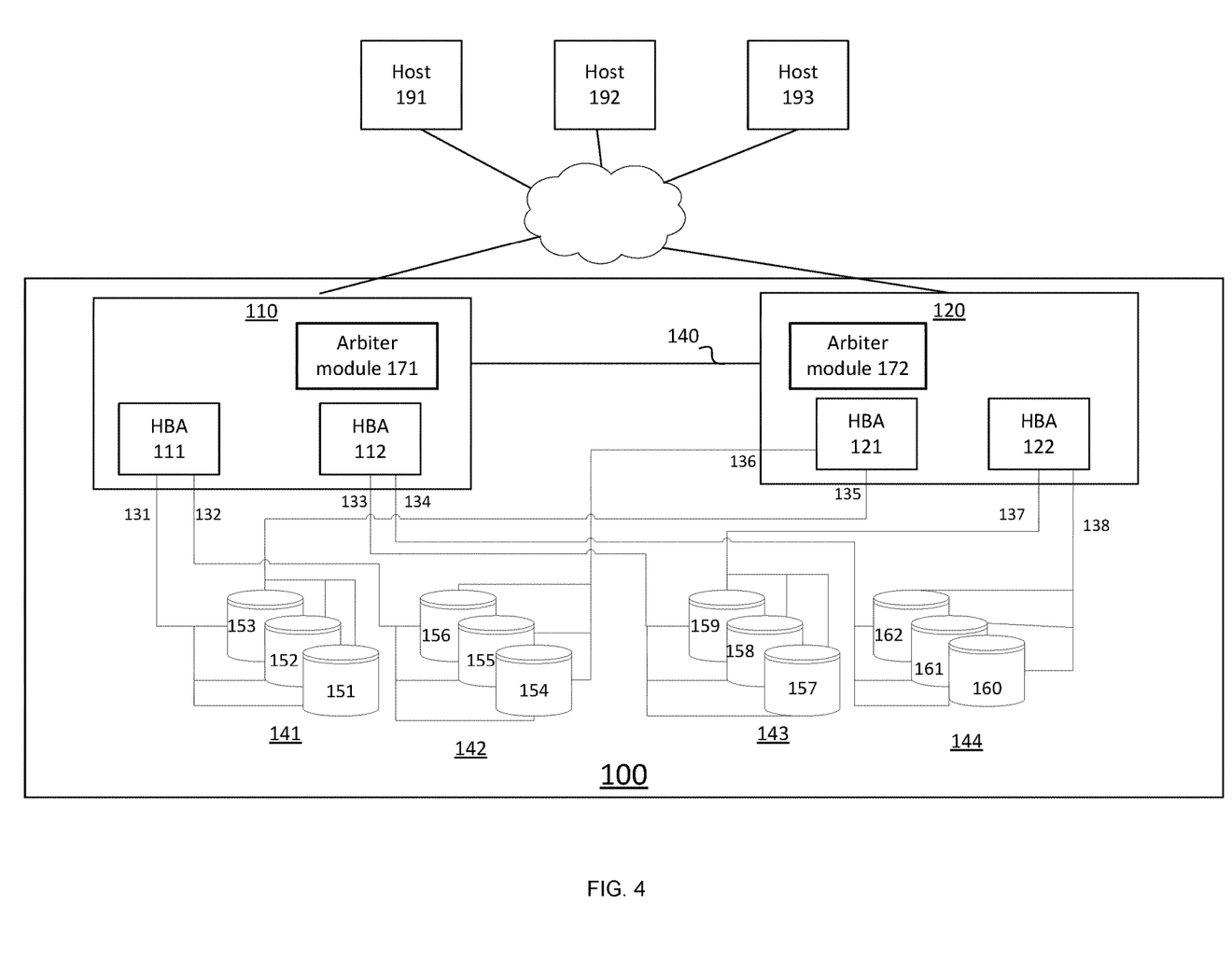
FIG. 4 illustrates an example of a storage system, a network and host computers.

FIG. 1 does not illustrate the arbiter module for simplicity of explanation. In FIG. 2 the arbiter module 170 is linked to the control nodes 110 and 120. In FIG. 3 the arbiter module 171 is located within control node 110. Alternatively, the arbiter module may be located within control node 120. In FIG. 4 there is one arbiter module 171 in control node 110 and another arbiter module 172 in control node 120. Arbiter modules 171 and 172 may determine which control node will perform an error recovery process.

The number of control nodes in storage system 100 and/or the number of control nodes that participate in an arbitration may exceed two. If, for example, there are three control nodes, two of them request to perform error recovery simultaneously, and only a first control node is granted to perform the error recovery while the second requesting control node receives a denial, then both the second control and the third control node can share the extra load imposed by requiring to handle access requests redirected from the first control node. If all three nodes request to perform error recovery simultaneously, then only a first control node may be granted to perform the error recovery while the other two requesting control nodes may receive a denial.

Any arbiter module may apply any arbitration process.

The arbitration process may be random, pseudo-random or non-random.

Non-limiting examples of arbitration rules may include—the first to request, round robin, the last control node that was denied, and the like.

The arbitration may take into account the scope of the memory devices that will be affected by the error recovery process. For example—the arbitration may prefer to deny a request to perform an error recovery process that will halt communication to fewer (or more) storage devices. Yet for another example—the arbitration may prefer to deny a request to perform an error recovery process that is expected to take more time.

The arbitration may take into account the history of previous error recovery processes. For example—the arbitration may estimate the expected length of a current (or future) error recovery process and prefer to deny shorter or longer expected error recovery processes.

The arbitration process may estimate the impact on access—taking into account expected access patterns (of the host computer), amount of storage devices that cannot be accessed by a certain control node during the error recovery processes, and the like.

Figure 5:
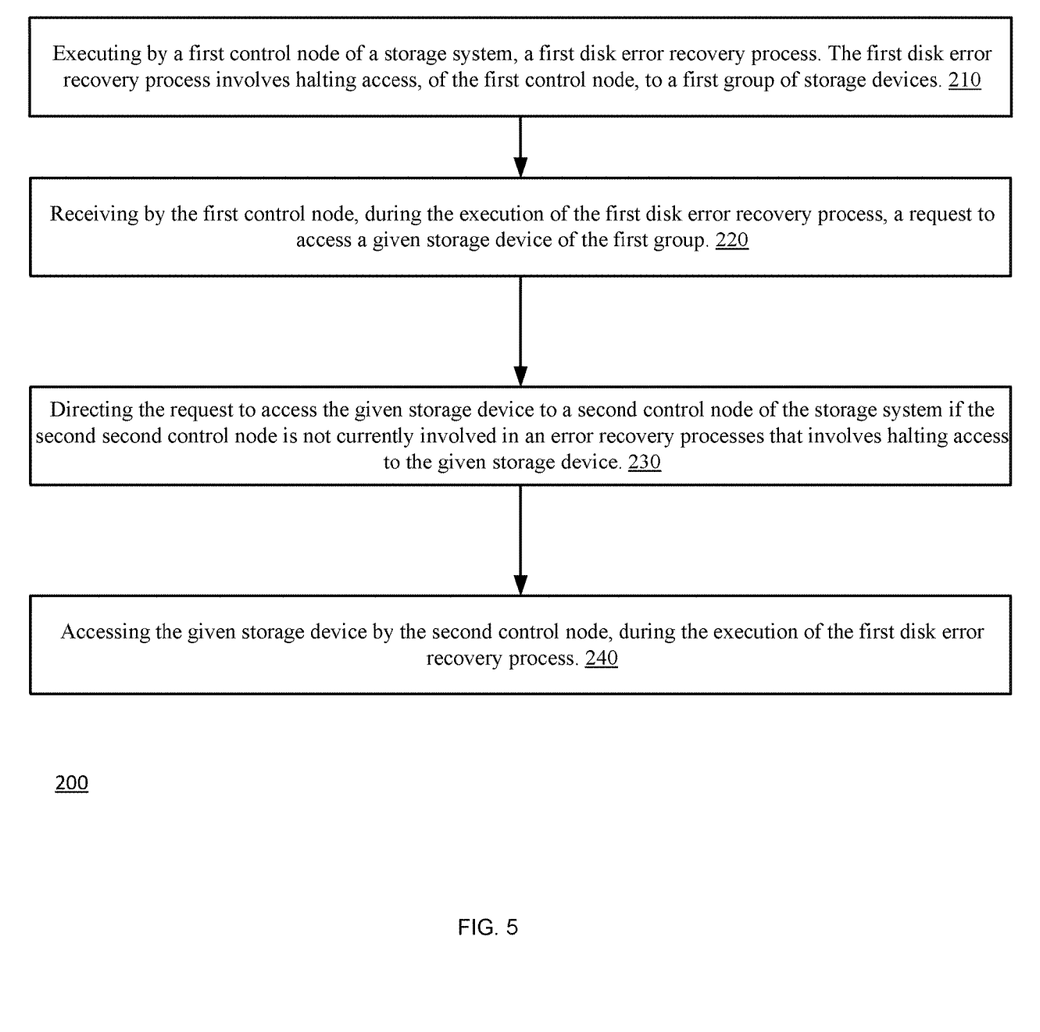
FIG. 5 illustrates an example of a method.

FIG. 5 illustrates method 200 for disk error recovery management.

Method 200 may include:
a. Step 210 of executing by a first control node of a storage system, a first disk error recovery process. The first disk error recovery process involves halting access, of the first control node, to a first group of storage devices. Halting access to the first group of storage devices may occur due to a reset operation towards a storage element, performed during the first disk error recovery process. The reset operation may include a reset of at least one storage device of the first group of storage devices, or a reset to any storage element that is included in the path between the first control node and the first group of storage devices, such as: a reset to the communication link (e.g., bus) between the first control node and the first group of storage devices, a reset of the interface (e.g., HBA) that couples the first control node to the first group of storage devices, etc.
b. Step 220 of receiving by the first control node, during the execution of the first disk error recovery process, a request to access a given storage device of the first group. Step 220 occurs during the execution of step 210.
c. Step 230 of directing the request to access the given storage device to a second control node of the storage system if the second control node is not currently involved in an error recovery process that involves halting access to the given storage device.
d. Step 240 of accessing the given storage device by the second control node, during the execution of the first disk error recovery process.

The storage devices may include disks. The storage devices may be SCSI (Small Computer System Interface) disks.

Method 200 may be executed by any storage system of the storage systems illustrated in FIGS. 1-4.

Figure 6:
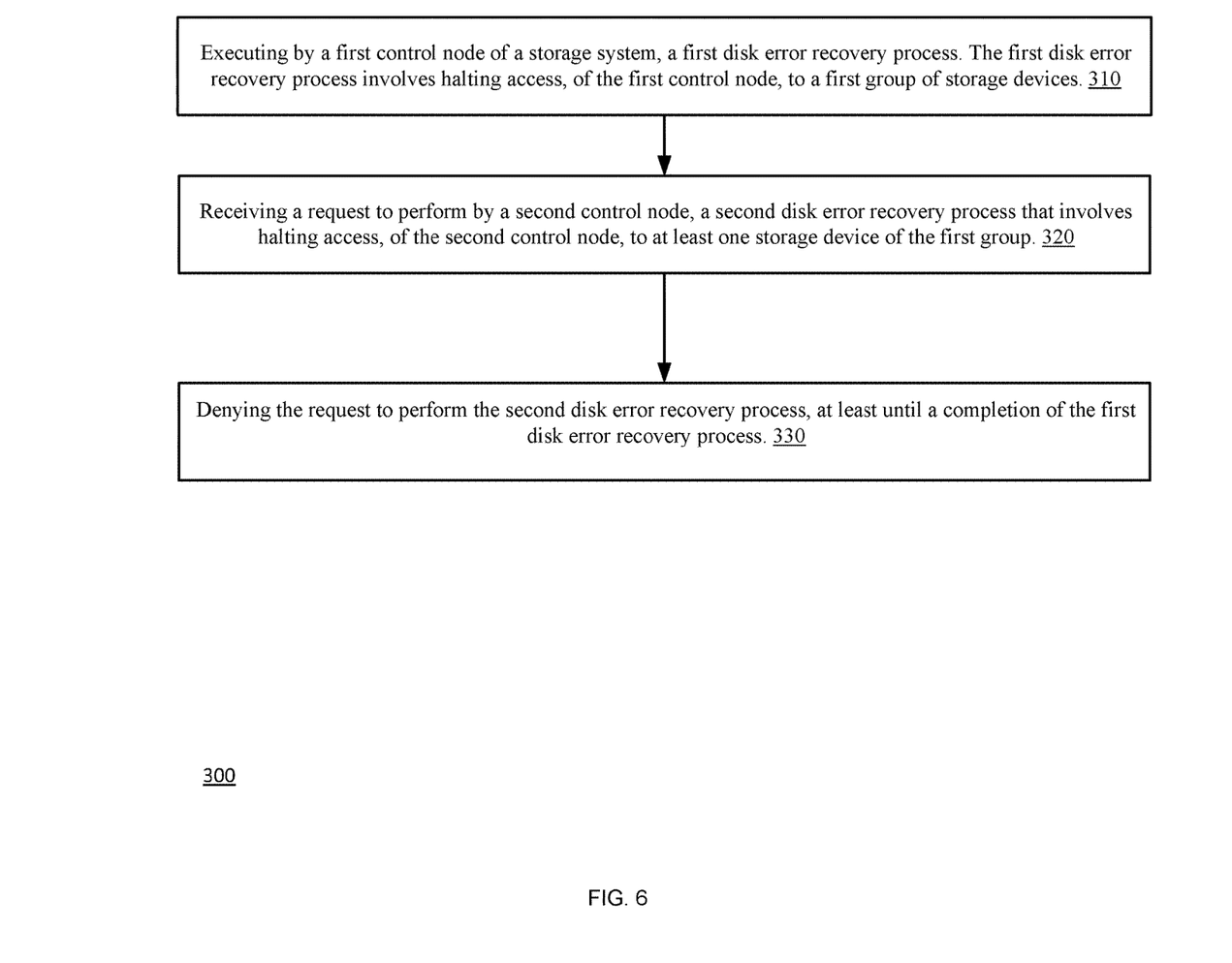
FIG. 6 illustrates a method.

FIG. 6 illustrates method 300 for disk error recovery management.

Method 200 may include:
a. Step 310 of executing by a first control node of a storage system, a first disk error recovery process. The first disk error recovery process involves halting access, of the first control node, to a first group of storage devices.
b. Step 320 of receiving a request to perform by a second control node, a second disk error recovery process that involves halting access, of the second control node, to at least one storage device of the first group.
c. Step 330 of denying the request to perform the second disk error recovery process, at least until a completion of the first disk error recovery process.

Figure 7:
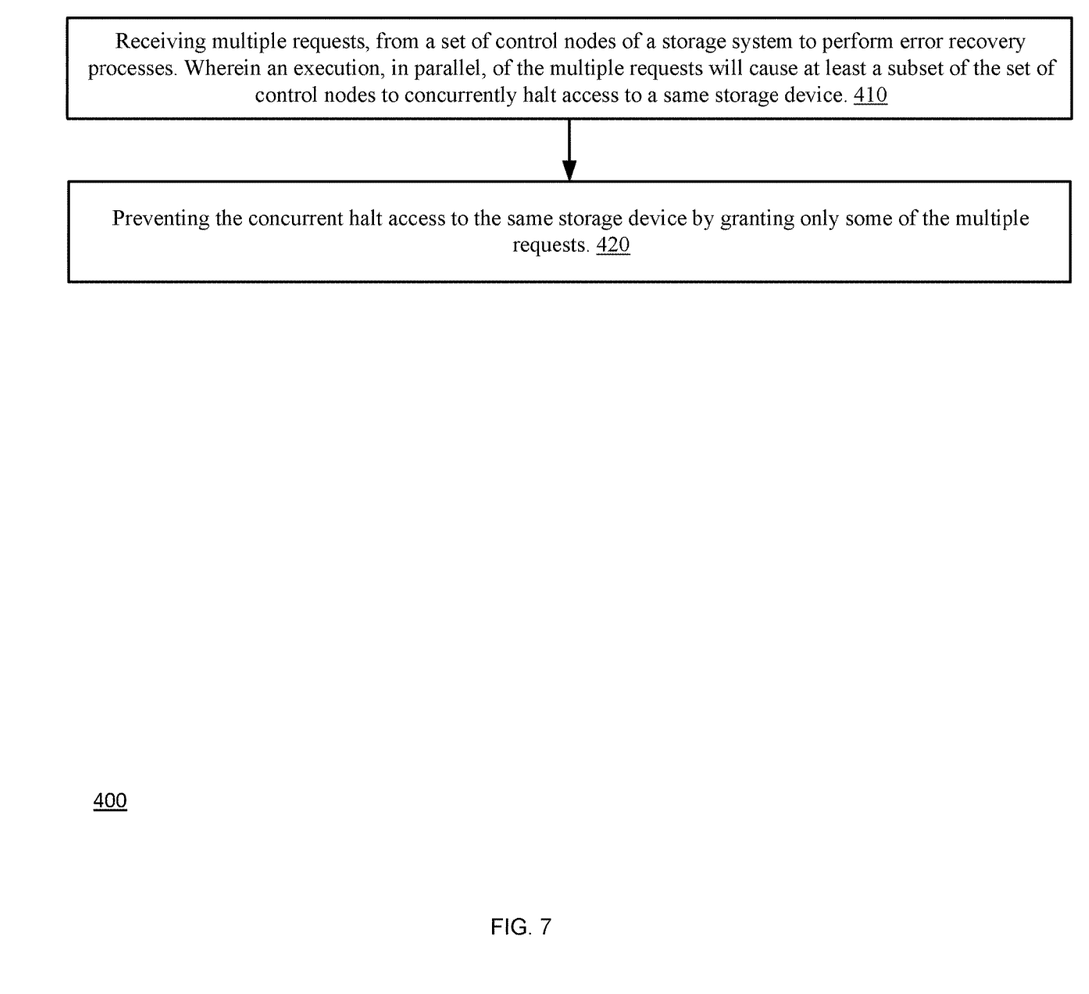
FIG. 7 illustrates an example of a method.

FIG. 7 illustrates method 400 for disk error recovery management.

Method 400 may include:
a. Step 410 of receiving multiple requests, from a set of control nodes of a storage system to perform error recovery processes. Wherein an execution, in parallel, of the multiple requests will cause at least a subset of the set of control nodes to concurrently halt access to a same storage device.
b. Step 420 of preventing the concurrent halt access to the same storage device by granting only some of the multiple requests.

Step 420 may include selecting, out of the multiple requests, the some of the multiple requests.

The selecting may include applying a random selection process, applying a pseudo-random selection process, applying a non-random selection process, and the like.

Step 420 may include selecting in response to an outcome of at least one previous selection process. For example—applying a fairness parameter (or any other parameter) for distributing denials in a fair manner between different control nodes.

The number of multiple requests may equal two or may exceed two. The number of some of the multiple requests may equal one or may exceed one.

Step 410 may include (i) receiving a request from a first control node of a storage system to perform a first disk error recovery process and (ii) receiving a request from a second control node of the storage system to perform a second disk error recovery process, wherein the first and second disk error recovery processes involve halting access to a given storage device.

Step 420 may include selecting one of these requests and denying the other request.

The terms arbitrating and selecting are used in an interchangeable manner.

Any of the mentioned above methods may include aggregating requests to perform error recovery process and then selecting or arbitrating between the requests—or performing the selection or arbitration without aggregating requests.

The terms "including", "comprising", "having", "consisting" and "consisting essentially of" are used in an interchangeable manner. For example—any method may include at least the steps included in the figures and/or in the specification, only the steps included in the figures and/or the specification.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for disk error recovery management, the method comprises:
   executing by a first control node of a storage system, a first disk error recovery process; wherein the first disk error recovery process involves halting access, of the first control node, to a first group of storage devices;
   receiving by the first control node, during the execution of the first disk error recovery process, a request to access a given storage device of the first group;
   directing, by the first control node, the request to access the given storage device to a second control node of the storage system if the second control node is not currently involved in an error recovery process that involves halting access to the given storage device; and
   accessing the given storage device by the second control node, during the execution of the first disk error recovery process.

2. The method according to claim 1, wherein the storage devices comprise disks.

3. The method according to claim 1, comprising denying the request to access the given storage device if the second control node is currently involved in the error recovery process that involves halting access to the given storage device.

4. The method according to claim 1, comprising relaying the request to access the given storage device to a third control node if (i) the third control node is not currently involved in the error recovery process that involves halting access to the given storage device, and (ii) if the second control node is currently involved in the error recovery process that involves halting access to the given storage device.

5. The method according to claim 1, comprising:
   receiving, during the execution of the first disk error recovery process, a request to perform, by a second control node of the storage system, a second disk error recovery process that involves halting access, of the second control node, to at least one storage device of the first group; and
   denying the request to perform the second disk error recovery process, at least until a completion of the first disk error recovery process.

6. The method according to claim 1 comprising:
   requesting by the first control node, from an arbiter module of the storage system, a permission to perform the first disk error recovery process; and
   executing the first disk error recovery process, when the arbiter module grants the permission to perform the first disk error recovery process.

7. The method according to claim 1 comprising:
   requesting by the first control node, from an arbiter module of the storage system a first permission to perform the first disk error recovery process;
   requesting by the second control node, from the arbiter module, a second permission to perform a second disk error recovery process; wherein the second permission is requested concurrently with the first permission; and
   granting, by the arbiter module, only the first permission.

8. A method for disk error recovery management, the method comprises:
   executing by a first control node of a storage system, a first disk error recovery process; wherein the first disk error recovery process involves halting access, of the first control node, to a first group of storage devices;
   receiving a request to perform, by a second control node of the storage system, a second disk error recovery process that involves halting access, of the second control node, to at least one storage device of the first group; and
   denying the request to perform the second disk error recovery process, at least until a completion of the first disk error recovery process.

9. The method according to claim 8 wherein the denying of the request is executed by an arbiter of the storage system.

10. The method according to claim 9 wherein the arbiter is coupled to the first and second control node but does not belong to either one of the first and second control nodes.

11. The method according to claim 9 wherein the arbiter belongs to at least one of the first and second control nodes.

12. The method according to claim 8, comprising:
   receiving by the first control node, during the execution of the first disk error recovery process, a request to access a given storage device of the first group;
   directing the request to access the given storage device to the second control node of the storage system; and
   accessing the given storage device by the second control node, during the execution of the first disk error recovery process.

13. The method according to claim 8 comprising:
   requesting by the first control node, from an arbiter of the storage system and prior to the execution of the first disk error recovery process, a permission to perform the first disk error recovery process; and
   granting by the arbiter module the permission to perform the first disk error recovery process.

14. The method according to claim 13, wherein the receiving and the denying are performed by the arbiter; wherein an execution, in parallel, of the first and second disk error recovery processes will cause the first and second control nodes to concurrently halt access to a same storage device; wherein the method further comprising:
   preventing the concurrent halt access to the same storage device by granting only the permission to perform the first disk error recovery process.

15. A computer program product that stores instructions that once executed by a storage system causes the storage system to:
   execute by a first control node of a storage system, a first disk error recovery process; wherein the first disk error recovery process involves halting access, of the first control node, to a first group of storage devices;
   receive by the first control node, during the execution of the first disk error recovery process, a request to access a given storage device of the first group;
   direct the request to access the given storage device to a second control node of the storage system if the second control node is not currently involved in an error recovery process that involves halting access to the given storage device; and
   access the given storage device by the second control node, during the execution of the first disk error recovery process.

16. The computer program product according to claim 15, that stores instructions for denying the request to access the given storage device if the second control node is currently involved in the error recovery process that involves halting access to the given storage device.

17. The computer program product according to claim 15, that stores instructions for relaying the request to access the given storage device to a third control node if (i) the third control node is not currently involved in the error recovery process that involves halting access to the given storage device, and (ii) if the second control node is currently involved in the error recovery process that involves halting access to the given storage device.

18. The computer program product according to claim 15, that stores instructions for:
  requesting by the first control node, from an arbiter module of the storage system, a permission to perform the first disk error recovery process; and
  executing the first disk error recovery process, when the arbiter module grants the permission to perform the first disk error recovery process.

19. The computer program product according to claim 15, that stores instructions for:
  requesting by the first control node, from an arbiter module of the storage system, a first permission to perform the first disk error recovery process;
  requesting by the second control node, from the arbiter module, a second permission to perform a second disk error recovery process; wherein the second permission is requested concurrently with the first permission; and
  granting, by the arbiter module, only the first permission.

* * * * *